United States Patent [19]

Suzuki

[11] Patent Number: 4,524,308
[45] Date of Patent: Jun. 18, 1985

[54] CIRCUITS FOR ACCOMPLISHING ELECTRON BEAM CONVERGENCE IN COLOR CATHODE RAY TUBES

[75] Inventor: Manabu Suzuki, Tokyo, Japan
[73] Assignee: Sony Corporation, Tokyo, Japan
[21] Appl. No.: 616,248
[22] Filed: Jun. 1, 1984
[51] Int. Cl.³ .................... H01J 29/70; H01J 29/76
[52] U.S. Cl. .................................................. 315/368
[58] Field of Search ................................ 315/368, 371

[56] References Cited

U.S. PATENT DOCUMENTS

| | | | |
|---|---|---|---|
| 4,095,137 | 6/1978 | Oswald | 315/368 |
| 4,318,032 | 3/1982 | Kureha | 315/368 |

*Primary Examiner*—Theodore M. Blum
*Attorney, Agent, or Firm*—Lewis H. Eslinger; Alvin Sinderbrand

[57] ABSTRACT

A circuit for accomplishing electron beam convergence in a color cathode ray tube, which comprises a first circuit arrangement for producing a first misconvergence correcting voltage with which dynamic misconvergence in the horizontal direction appearing every horizontal period on the display panel of a color cathode ray tube can be corrected independently in both the left and right sides of the display panel when it is supplied to a deflecting device provided for deflecting electron beams in the color cathode ray tube and its amplitude is adjusted, a second circuit arrangement for producing a second misconvergence correcting voltage with which dynamic misconvergence in the horizontal direction appearing every vertical period on the display panel can be corrected independently in the top, middle and bottom portions of the display panel when it is supplied to the deflecting device and its amplitude is adjusted, and an additional circuit arrangement for supplying the first and second misconvergence correcting voltages to the deflecting device.

5 Claims, 39 Drawing Figures

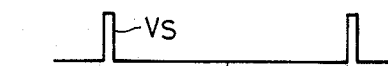
FIG. 4A
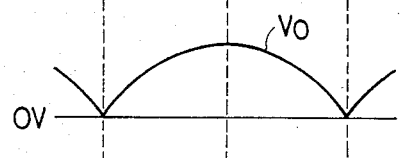
FIG. 4B
FIG. 4C
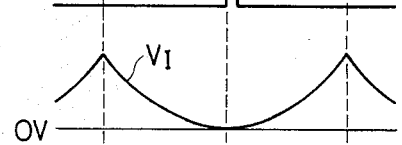
FIG. 4D
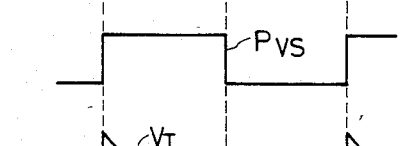
FIG. 4E
FIG. 4F
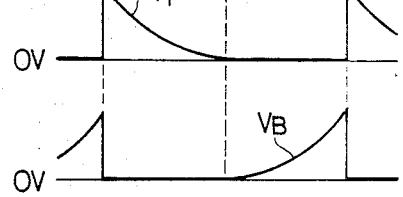
FIG. 4G
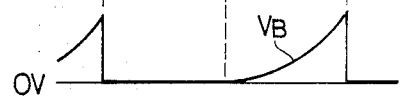
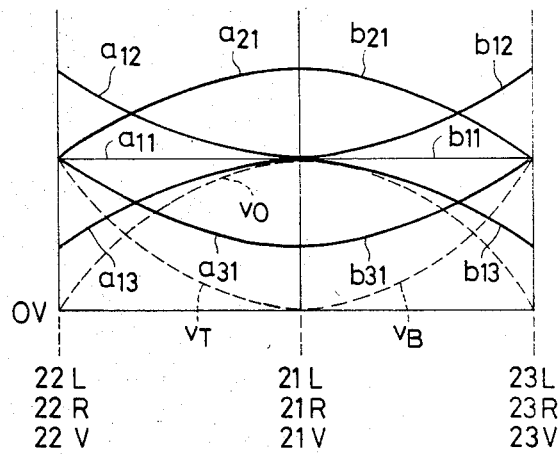
FIG. 5

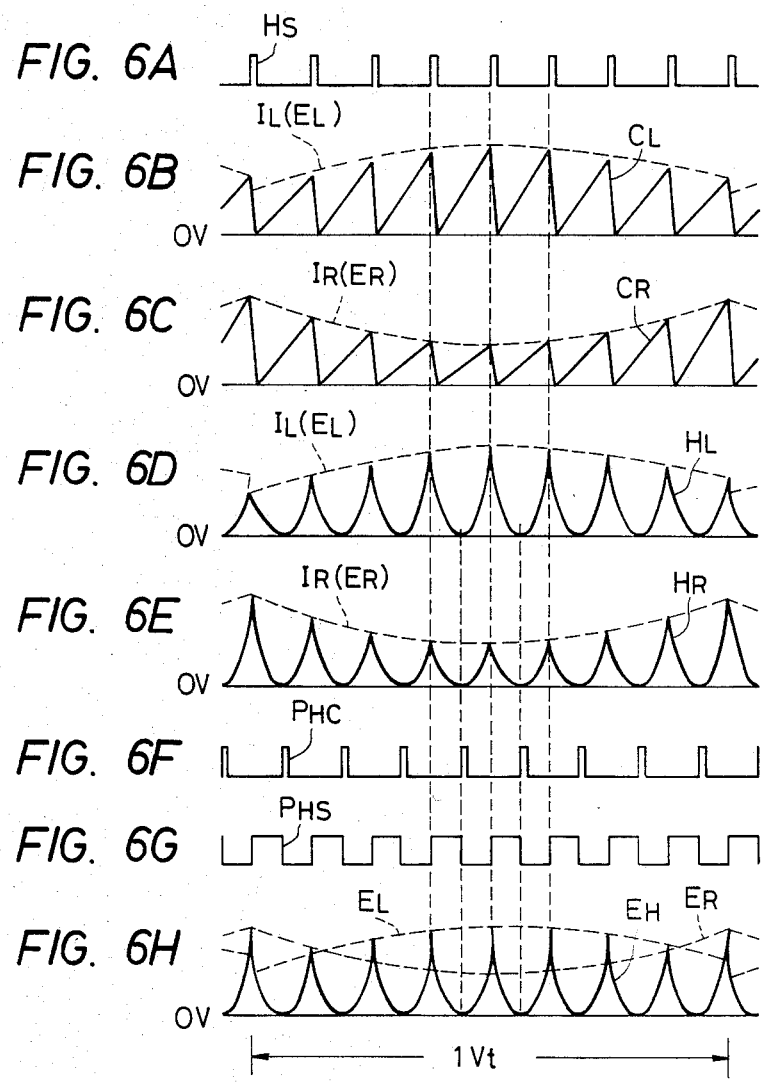

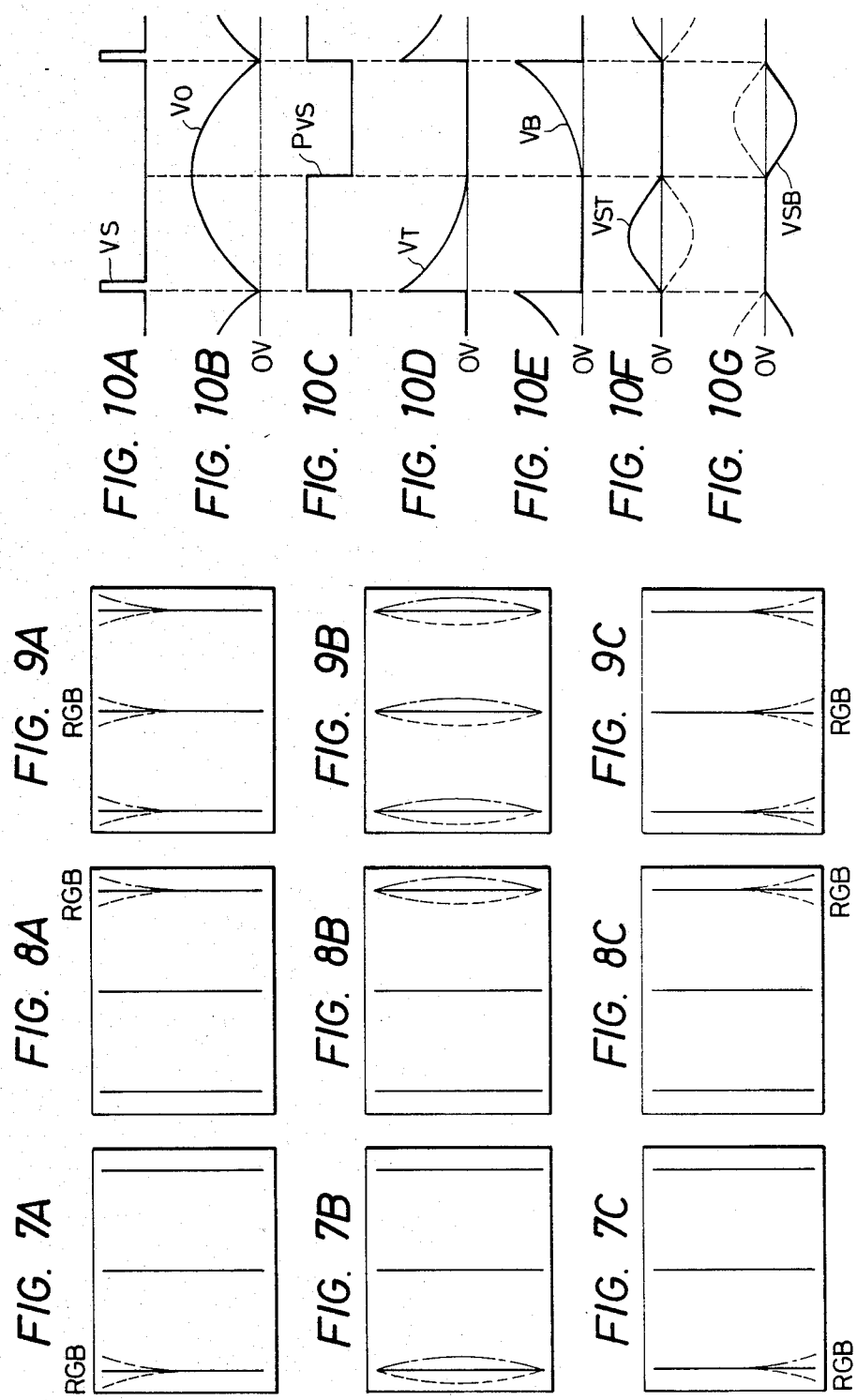

CIRCUITS FOR ACCOMPLISHING ELECTRON BEAM CONVERGENCE IN COLOR CATHODE RAY TUBES

BACKGROUND OF THE INVENTION

1. Field of the Invention

This invention relates generally to circuits for accomplishing convergence of electron beams on display panels of color cathode ray tubes, and more particularly, is directed to a circuit used with a color cathode ray tube for correcting dynamic misconvergence of electron beams therein so as to cause the color cathode ray tube to display fine images of high quality.

2. Description of the Prior Art

For the purpose of correction of dynamic misconvergence of electron beams in the horizontal direction caused on the display panel of a color cathode ray tube of the in-line type, such circuits as shown in FIGS. 1A and 1B in the drawings have been proposed. The circuit shown in FIG. 1A is used for correcting the dynamic misconvergence in the horizontal direction appearing at every horizontal period. In this circuit, a voltage of parabolic waveform having the horizontal period and a voltage of saw-tooth waveform having the horizontal period are mixed in a mixer 1H, and a mixed voltage obtained from the mixer 1H is supplied through an amplifier 2H to a coil 3H provided for correcting the dynamic misconvergence in the horizontal direction appearing every horizontal period on the display panel of the color cathord ray tube. With such an arrangement, the condition of electron beam convergence in the color cathode ray tube can be adjusted between the situation where an electron beam for stimulating a phosphor provided on the display panel for emitting red light (hereinafter referred to as a red beam) is shifted to the left on the display panel as shown in the left side of FIG. 2A and the situation where the red beam is shifted to the right on the display panel as shown in the right side of FIG. 2A by means of varying the amplitude of the voltage of parabolic waveform having the horizontal period. The condition of electron beam convergence can be adjusted also between the situation where the red beam is shifted to the inside on the display panel as shown in the left side of FIG. 2B and the situation where the red beam is shifted to the outside on the display panel as shown in the right side of FIG. 2B by means of varying both the amplitude and polarity of the voltage of saw-tooth waveform having the horizontal period.

On the other hand, the circuit shown in FIG. 1B is used for correcting the dynamic misconvergence in the horizontal direction appearing at every vertical period. In this circuit, a voltage of parabolic waveform having the vertical period and a voltage of saw-tooth waveform having the vertical period are mixed in a mixer 1V, and a mixed voltage obtained from the mixer 1V is supplied through an amplified 2V to a coil 3V provided for correcting the dynamic misconvergence in the horizontal direction appearing every vertical period on the display panel of the color cathord ray tube. With such an arrangement, the condition of electron beam convergence in the color cathode ray tube can be adjusted between such a situation as shown in the left side of FIG. 2C and such a situation as shown in the right side of FIG. 2C by means of varying the amplitude of the voltage of parabolic waveform having the vertical period. The condition of electron beam convergence can be adjusted also between such a situation as shown in the left side of FIG. 2D and such a situation as shown in the right side of FIG. 2D by means of varying both the amplitude and polarity of the voltage of sawtooth waveform having the vertical period.

Incidentally, through FIGS. 2A to 2D showing various situations of the dynamic misconvergence in the horizontal direction as mentioned above, R, G and B indicate the positions on the display panel of the red beam, an electron beam for stimulating a phosphor provided on the display panel for emitting green light (a green beam) and an electron beam for stimulating a phosphor provided on the display panel for emitting blue light (a blue beem), respectively.

With the previously proposed circuits as mentioned above, since the positions of the electron beams on the display panel are shifted at both the left and right sides of the display panel by either one of the variation of the amplitude of the voltage of parabolic waveform having the horizontal period and the variations of the amplitude and polarity of the voltage of saw-tooth waveform having the horizontal period on the occasion of adjustment for correcting the dynamic misconvergence in the horizontal direction appearing every horizontal period, as understood from FIGS. 2A and 2B, it is necessary for correcting the dynamic misconvergence in the horizontal direction appearing every horizontal period at both the left and right sides on the display panel to establish a tracking relation between the adjustment by means of varying the amplitude of the voltage of parabolic waveform having the horizontal period and the adjustment by means of varying the amplitude and polarity of the voltage of saw-tooth waveform having the horizontal period. Further, since the positions of the electron beams on the display panel are shifted also at both the top and bottom sides of the display panel by either one of the variation of the amplitude of the voltage of parabolic waveform having the vertical period and the variations of the amplitude and polarity of the voltage of saw-tooth waveform having the vertical period on the occasion of adjustment for correcting the dynamic misconvergence in the horizontal direction appearing every vertical period, as understood from FIGS. 2C and 2D, it is necessary for correcting the dynamic misconvergence in the horizontal direction appearing every vertical period at both the top and bottom sides on the display panel to establish a tracking relation between the adjustment by means of varying the amplitude of the voltage of parabolic waveform having the vertical period and the adjustment by means of varying the amplitude and polarity of the voltage of saw-tooth waveform having the vertical period. As a result, the adjustments for correcting the dynamic misconvergence in the horizontal direction require very complicated and troublesome control, and moreover the misconvergence at each of four corners of the display panel where the electron beams are affected with all the adjustments is substantially unable to be eliminated.

OBJECTS AND SUMMARY OF THE INVENTION

Accordingly, it is an object of the present invention to provide a circuit for accomplishing electron beam convergence in a color cathode ray tube which avoids the above described problems and difficulties encountered with the prior art.

Another object of the present invention is to provide a circuit for accomplishing electron beam convergence in a color cathode ray tube which is operative to correct accurately dynamic misconvergence of electron beams in the horizontal direction caused on the display panel of a color cathode ray tube of the in-line type with relatively simple adjustments.

A further object of the present invention is to provide a circuit for accomplishing electron beam convergence in a color cathode ray tube which is suitable to be used with a color cathode ray tube of the in-line type employed in a graphic display apparatus, data display apparatus or the like and therefore required to display fine images of high quality.

According to an aspect of the present invention, there is provided a circuit for accomplishing electron beam convergence in a color cathode ray tube which comprises a first voltage generating circuit block for producing a first voltage of parabolic waveform in a first polarity which has the vertical period and is clamped to be earth potential at the beginning and end of each vertical scanning period, a second voltage composed of a portion of parabolic waveform in a second polarity, which has the vertical period and is clamped to be earth potential at the middle of each vertical scanning period, obtained in the first half of each vertical scanning period and a portion of earth potential obtained in the second half of each vertical scanning period, and a third voltage composed of a portion of earth potential obtained in the first half of each vertical scanning period and a portion of parabolic waveform in the second polarity, which has the vertical period and is clamped to be earth potential at the middle of each vertical scanning period, obtained in the second half of each vertical scanning period; first, second and third voltage mixing circuit blocks for producing first, second and third mixed voltages each obtained from the first, second and third voltages, respectively, in such a manner that the first, second and third voltages are adjusted in amplitude separately and them mixed with one another; a second voltage generating circuit block for producing a first correcting voltage which has a waveform obtained by modulating the amplitude of a voltage of paravolic waveform having the horizontal period with the first mixed voltage and is clamped to be earth potential at the middle of each horizontal scanning period; a third voltage generating circuit block for producing a second correcting voltage which has a waveform obtained by modulating the amplitude of the voltage of parabolic waveform having the horizontal period with the second mixed voltage and is clamped to be earth potential at the middle of each horizontal scanning period; a switch circuit block for extracting the first correcting voltage during the first half of each horizontal scanning period and the second correcting voltage during the following half of the horizontal scanning period; and a voltage supplying circuit block for supplying the voltages extracted by the switching circuit block and the third mixed voltage to a horizontal deflecting device provided for deflecting electron beams in the color cathode ray tube to accomplish their convergence.

With the circuit according to the present invention thus constituted, the dynamic misconvergence in the horizontal direction appearing every horizontal period at each of the left top portion, left middle portion, left bottom portion, right top portion, right middle portion and right bottom portion of the display panel of the color cathode ray tube can be corrected independently, and further the dynamic misconvergence in the horizontal direction appearing every vertical period at each of the top portion, middle portion and bottom portion of the display panel of the color cathode ray tube can be corrected independently. Accordingly, the circuit according to the present invention can be operative to correct accurately the dinamic misconvergence in the horizontal direction at each of eight portions, namely, the left top portion, left middle portion, left bottom portion, central top portion, central bottom portion, right top portion, right middle portion and right bottom portion of the display panel with simplified adjustments without establishing any tracking relation among them.

The above and other objects, features and advantages of the present invention will become apparent from the following detailed description thereof taken in conjunction with the accompanying drawings.

BRIEF DESCRIPTION OF THE DRAWINGS

FIGS. 4A to 4G, 5, 6A to 6H are waveform diagrams used for explaining the operation of the embodiment shown in FIG. 3;

FIGS. 7A to 7C, 8A to 8C and 9A to 9C are illustrations used for explaining positional shift of electron beams on the display panel of a color cathode ray tube caused by the embodiment shown in FIG. 3; and FIGS. 10A to 10G are waveform diagrams used for explaining the operation of another embodiment of circuit for accomplishing electron beam convergence in a color cathode ray tube according to the present invention.

DESCRIPTION OF THE PREFERRED EMBODIMENTS

Figures 2A, 2B, 2C, 2D:
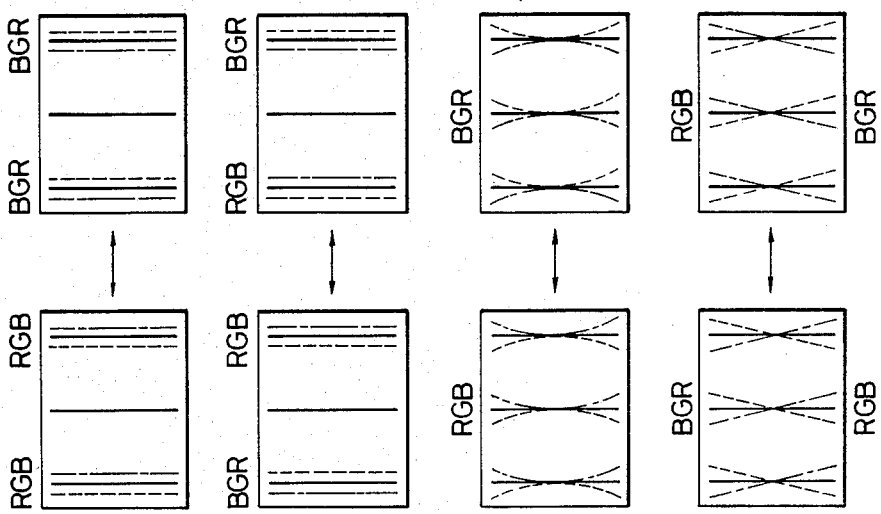
FIGS. 2A to 2D are illustrations used for explaining positional shift of electron beams on the display panel of a color cathode ray tube caused by the circuits shown in FIGS. 1A and 1B.
Figure 1A:
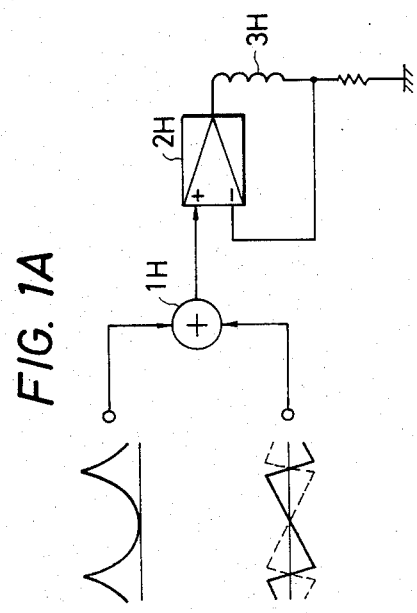
FIGS. 1A and 1B are schematic circuit diagrams showing previously proposed circuits for correcting dynamic misconvergence of electron beams in a color cathode ray tube of in line type.
Figure 1B:
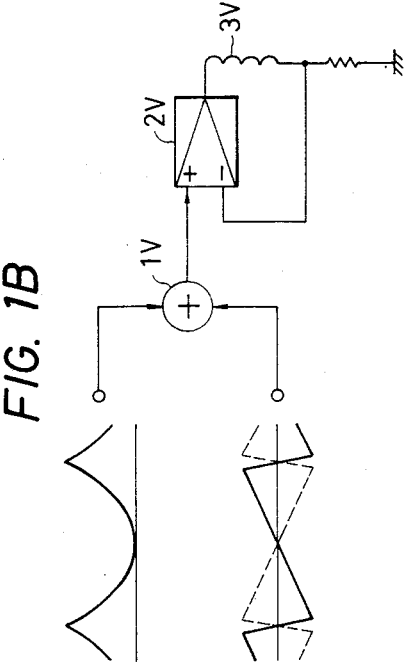
Figure 3:
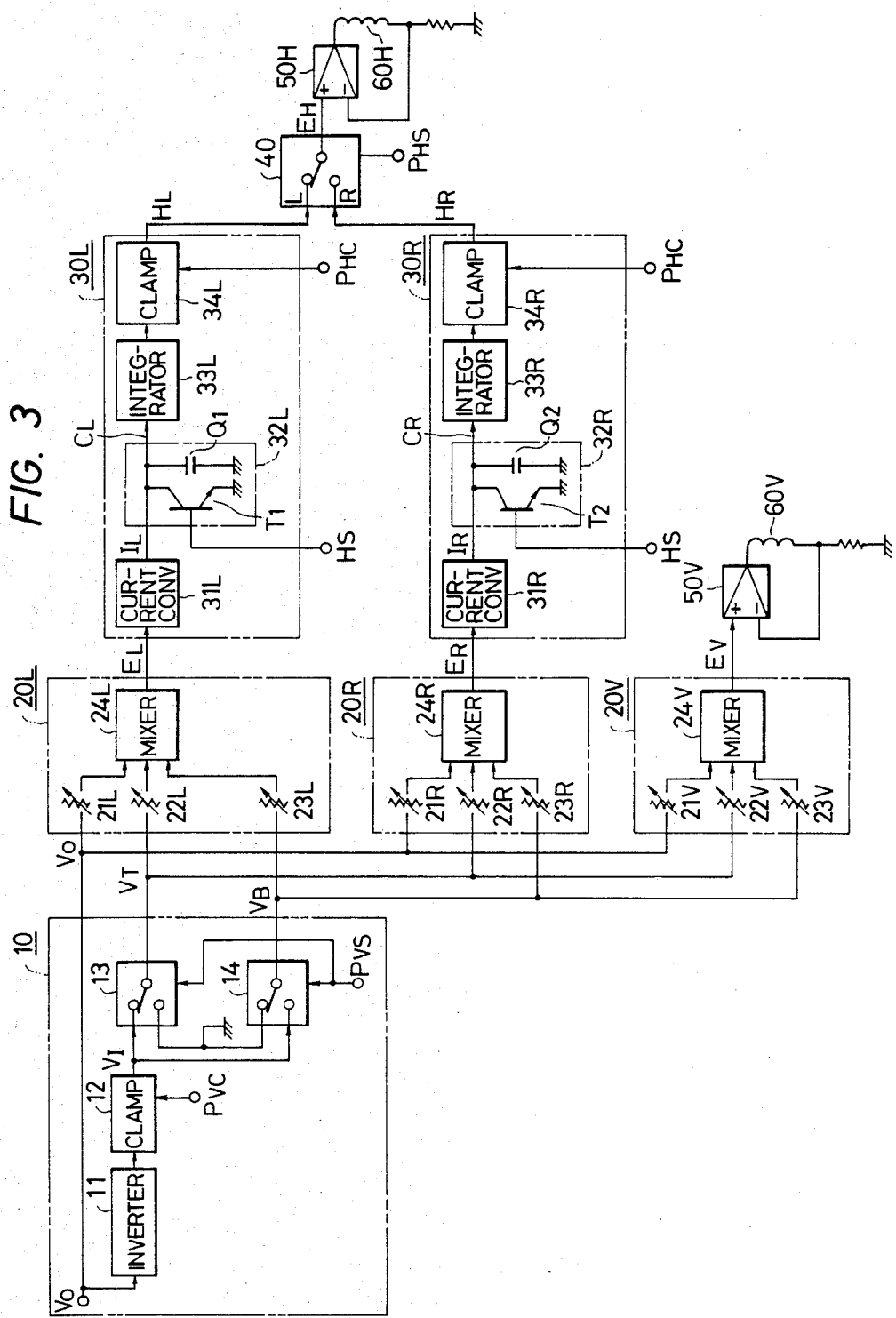
FIG. 3 is a circuit diagram showing one embodiment of circuit for accomplishing electron beam convergence in a color cathode ray tube according to the present invention.

FIG. 3 showns an example of a circuit for accomplishing electron beam convergence in a color cathode ray tube according to the present invention. In this circuit, a first, second and third voltages $V_O$, $V_T$ and $V_B$ each having the vertical period are obtained from a common voltage generating circuit block 10. The first voltage $V_O$ is synchronized with a vertical synchronous signal $V_S$, as shown in FIG. 4A, to have a parabolic waveform in a first polarity having the vertical period and clamped to be earth potential at the beginning and end of each vertical scanning period, as shown in FIG. 4B. This first voltage $V_O$ is supplied to an inverter 11 to be inverted in polarity and then further supplied to a clamping circuit 12 to be clamped therein in accordance with a clamping pulse $P_{VC}$, as shown in FIG. 4C, to turn to a voltage $V_I$ taking earth potential at the middle of each vertical period, as shown in FIG. 4D. The voltage $V_1$ obtained from the clamping circuit 12 is supplied to one of input terminals of each of switches 13 and 14. The other of the input terminals of each of the switches 13 and 14 is grounded. The switches 13 and 14 are controlled by a switching pulse $P_{VS}$ taking different levels in the first half of each vertical scanning period and in the following half of the vertical scanning period, as shown in FIG. 4E, to select the input terminal supplied with the voltage $V_1$ during the first half of every vertical scanning period and the input terminal grounded during the following half of the vertical scanning period. As a result, from the switch 13, a second voltage $V_T$ composed of a portion which is identical with the voltage $V_1$ during the first half of each vertical scanning period and a portion which takes earth potential during the second half of each vertical scanning period, as shown in FIG. 4F, is derived. Further, from the switch 14, a third voltage $V_B$ composed of a portion which takes earth potential during the first half of each vertical scanning period and a portion which is identical with the voltage $V_1$ during the second half each the vertical scanning period, as shown in FIG. 4G, is derived.

These first, second and third voltages $V_O$, $V_T$ and $V_B$ are supplied to all first, second and third voltage mixing circuit blocks 20L, 20R and 20V. In the first voltage mixing circuit block 20L, the first, second and third voltages $V_O$, $V_T$ and $V_B$ are adjusted in amplitude separately by first, second and third amplitude adjusters 21L, 22L and 23L, respectively, and then mixed with one another in a first mixer 24L to produce a first mixed voltage $E_L$. In the second voltage mixing circuit block 20R, the first, second and third voltages $V_O$, $V_T$ and $V_B$ are adjusted in amplitude separately by fourth, fifth and sixth amplitude adjusters 21R, 22R and 23R, respectively, and then mixed with one another in a second mixer 24R to produce a second mixed voltage $E_R$. Further, in the third voltage mixing circuit block 20V, the first, second and third voltages $V_O$, $V_T$ and $V_B$ are adjusted in amplitude separately by seventh, eighth and ninth amplitude adjusters 21V, 22V and 23V, respectively, and then mixed with one another in a third mixer 24V to produce a third mixed voltage $E_V$.

With regard to the first voltage mixing circuit block 20L, in the case where each of the first, second and third amplitude adjusters 21L, 22L and 22V is set to take a neutral position, the first mixed voltage $E_L$ has a constant DC voltage value as indicated with lines $a_{11}$ and $b_{11}$ in FIG. 5. In the case where the first amplitude adjuster 21L is held to take the neutral position and the second amplitude adjuster 22L is set to take a deviated position, the first mixed voltage $E_L$ takes a portion of a parabolic waveform such as indicated with a curve $a_{12}$ or $a_{13}$ in FIG. 5 during the first half of each vertical scanning period. In the case where the first amplitude adjuster 21L is held to take the neutral position and the third amplitude adjuster 23L is set to take a deviated position, the first mixed voltage $E_L$ takes a portion of a parabolic waveform such as indicated with a curve $b_{12}$ or $b_{13}$ in FIG. 5 during the second half of each vertical scanning period. In the case where the second and third amplitude adjusters 22L and 23L are held to take the respective neitral positions thereof and the first amplitude adjuster 21L is set to such a deviated position as to increase the amplitude of the first voltage $V_O$, the first mixed voltage $E_L$ has a parabolic waveform as indicated with curves $a_{21}$ and $b_{21}$ in FIG. 5. Further, in the case where the second and third amplitude adjusters 22L and 23L are held to take the respective neutral positions thereof and the first amplitude adjuster 21L is set to take such a deviated position as to reduce the amplitude of the first voltage $V_O$, the first mixed voltage $E_L$ has a parabolic waveform as indicated with curves $a_{31}$ and $b_{21}$ in FIG. 5.

The second and third mixed voltages $E_R$ and $E_V$ produced in the second and third voltage mixing circuit blocks 20R and 20V, respectively, are also obtained in the similar manner as the first mixed voltage $E_L$.

As understood from the above, the amplitude of the first mixed voltage $E_L$ in each of the beginning, middle and end portions of each vertical scanning period corresponding to the top, middle and bottom portions of the display panel of a color cathode ray tube, respectively, can be adjusted independently by the second, first or third amplitude adjuster 22L, 21L or 23L. Similarly, the amplitude of the second mixed voltage $E_R$ in each of the beginning, middle and end portions of each vertical scanning period can be adjusted independently by the fifth, fourth or sixth amplitude adjuster 22R, 21R or 23R, and the amplitude of the third mixed voltage $E_V$ in each of the beginning, middle and end portions of each vertical scanning period can be adjusted independently by the eighth, seventh or ninth amplitude adjuster 22V, 21V or 23V. Besides, one of the first, second and third mixed voltages $E_L$, $E_R$ and $E_V$ can be adjusted in amplitude independently of the others.

The first mixed voltage $E_L$ obtained from the first voltage mixing circuit block 20L is supplied to a voltage generating circuit block 30L and a first correcting voltage $H_L$ which has a waveform obtained by modulating the amplitude of a voltage of parabolic waveform having the horizontal period with the first mixed voltage $E_L$ and is clamped to take earth potential at the middle of each horizontal scanning period, is derived therefrom. In the voltage generating circuit block 30L, the first mixed voltage $E_L$ is subjected to voltage to current conversion in a current converter 31L so as to produce a current $I_L$, and the current $I_L$ is supplied to an integrator 32L to cause integrating operation therein. The integrator 32L is formed with, for example, a capacitor $Q_1$ connected to the output of the current converter 31L and a transistor $T_1$ having a collector to emitter path connected in parallel with the capacitor $Q_1$ and a base supplied with a horizontal synchronous signal or flyback pulse signal as a discharging pulse signal $H_S$, as shown in FIG. 6A. Accordingly, in the integrator 32L, a voltage $C_L$ of saw-tooth waveform having the horizontal period is obtained across the capacitor $Q_1$ with its amplitude varied in response to the current $I_L$ from the current converter 31L. Consequently, the voltage $C_L$ of saw-tooth waveform having the horizontal period and modulated in amplitude with the first mixed voltage $E_L$ having the vertical period, as shown in FIG. 6B, is obtained from the integrator 32L. This voltage $C_L$ is supplied to an integrator 33L to be converted therein to a voltage of parabolic waveform having the horizontal period. Then, the voltage obtained from the integrator 33L is supplied to a clamping circuit 34L to be clamped therein in accordance with a clamping pulse $P_{HC}$, as shown in FIG. 6F, so as to take earth potential at the middle of each horizontal scanning period. As a result, the first correcting voltage $H_L$ which has the parabolic waveform having the horizontal period and modulated in amplitude with the first mixed voltage $E_L$ and is clamped to take earth potential at the middle of each horizontal scanning period, as shown in FIG. 6D, is obtained from the clamping circuit 34L.

On the other hand, the second mixed voltage $E_R$ obtained from the second voltage mixing circuit block 20R is supplied to a voltage generating circuit block 30R and a second correcting voltage $H_R$ which has a waveform obtained by modulating the amplitude of a voltage of parabolic waveform having the horizontal period with the second mixed voltage $E_R$ and is clamped to take earth potential at the middle of each horizontal scanning period, is derived therefrom in the similar manner as the first correcting voltage $H_L$. In the voltage generating circuit block 30R, the second mixed voltage $E_R$ is subjected to voltage to current conversion in a current converter 31R so as to produce a current $I_R$, and the current $I_R$ is supplied to an integrator 32R to cause integrating operation therein. The integrator 32R is formed with, for example, a capacitor $Q_2$ connected to the output of the current converter 31R and a transistor $T_2$ having a collector to emitter path connected in parallel with the capacitor $Q_2$ and a base supplied with the discharging pulse signal $H_S$. Accordingly, in the integrator 32R, a voltage $C_R$ of saw-tooth waveform having the horizontal period is obtained across the capacitor $Q_2$ with its amplitude varied in response to the current $I_R$ from the current converter 31R. Consequently, the voltage $C_R$ of saw-tooth waveform having the horizontal period and modulated in amplitude with the second mixed voltage $E_R$ having the vertical period, as shown in FIG. 6C, is obtained from the integrator 32R. This voltage $C_R$ is supplied to an integrator 33R to be converted therein to a voltage of parabolic waveform having the horizontal period. Then, the voltage obtained from the integrator 33R is supplied to a clamping circuit 34R to be clamped therein in accordance with the clamping pulse $P_{HC}$ so as to take earth potential at the middle of each horizontal scanning period. As a result, the second correcting voltage $H_R$ which has the parabolic waveform having the horizontal period and modulated in amplitude with the first mixed voltage $E_R$ and is clamped to take earth potential at the middle of each horizontal scanning period, as shown in FIG. 6E, is obtained from the clamping circuit 34R.

The first and second correcting voltages $H_L$ and $H_R$ obtained from the voltage generating circuit blocks 30L and 39R, respectively, are supplied to input terminals L and R of a switch 40. This switch 40 is controlled by a switching pulse $P_{HS}$ taking different levels in the first half of each horizontal scanning period and in the following half of the horizontal scanning period, as shown in FIG. 6G, so as to select the input terminal L to derive the first correcting voltage $H_L$ therefrom during the first half of each horizontal scanning period and to select the input terminal R to derive the second correcting voltage $H_R$ therefrom during the second half of each horizontal scanning period. As a result, a first misconvergence correcting voltage $E_H$ having a combined waveform, a portion of which appearing in one vertical scanning period $V_t$ is shown in FIG. 6H, is obtained from the switch 40 and supplied through an amplifier 50H to a coil 60H provided for correcting dynamic misconvergence in the horizontal direction appearing every horizontal period on the display panel of the color cathode ray tube.

The third mixed voltage $E_V$ obtained from the third voltage mixing circuit block 20V is supplied, as a second misconvergence correcting voltage, through an amplifier 50V to a coil 60V provided for correcting dynamic misconvergence in the horizontal direction appearing every vertical period on the display panel of the color cathode ray tube.

Incidentally, it is possible to employ electrostatic deflecting plates in place of the coils 50H and 50V for correcting the dynamic misconvergence in the horizontal direction, and in such a case, the first misconvergence correcting voltage $E_H$ and the second misconvergence correcting voltage (the third mixed voltage) $E_V$ may be combined with each other to be supplied to common electrostatic deflecting plates.

In connection with the circuit according to the present invention described above, the first misconvergence correcting voltage $E_H$ obtained from the switch 40 is composed of a portion of the first correcting voltage $H_L$, which has the parabolic waveform having the horizontal period and modulated in amplitude with the first mixed voltage $E_L$, extracted during the first half of each horizontal scanning period and a portion of the second correcting voltage $H_R$, which has the parabolic waveform having the horizontal period and modulated in amplitude with the second mixed voltage $E_R$, extracted during the second half of each horizontal scanning period. That is, the amplitude of the parabolic waveform of the first misconvergence correcting voltage $E_H$ is modulated with the first mixed voltage $E_L$ during the first half of each horizontal scanning period and with the second mixed voltage $E_R$ during the second half of each horizontal scanning period, separately. In addition to this, the first and second mixed voltages $E_L$ and $E_R$ can be adjusted independently. Accordingly, with the first misconvergence correcting voltage $E_H$ thus obtained, the dynamic misconvergence in the horizontal direction appearing every horizontal period on the display panel can be corrected independently in both the left and right sides of the display panel. Further, since the amplitude of each of the first and second mixed voltages $E_L$ and $E_R$ in each of the beginning, middle and end portions of each vertical scanning period corresponding to the top, middle and bottom portions on the display panel, respectively, can be adjusted separately, the dynamic misconvergence in the horizontal direction appearing every horizontal period in each of the left and right sides on the display panel can be corrected independently in the top, middle and bottom portions of the display panel.

Eventually, the dynamic misconvergence in the horizontal direction appearing every horizontal period on the display panel can be corrected independently in all the left top portion, left middle portion, left bottom portion, right top portion, right middle portion and right bottom portion of the display panel.

FIGS. 7A to 7C and 8A to 8C show positional relations of red, green and blue beams R, G and B on the display panel of the color cathode ray tube upon various adjustments for correcting the dynamic misconvergence in the horizontal direction appearing every horizontal period. With the first voltage mixing circuit block 20L, the positions of the red and blue beams in relation to the position of the green beam are moved at the left top portion of the display panel as shown in FIG. 7A when the second adjuster 22L is caused to operate, at the left middle portion of the display panel as shown in FIG. 7B when the first amplitude adjuster 21L is caused to operate, and at the left bottom portion of the display panel as shown in FIG. 7C when the third amplitude adjuster 23L, is caused to operate. Further, with the second voltage mixing circuit block 20R, the positions of the electron beams are moved at the right top portion of the display panel as shown in FIG. 8A when the fifth amplitude adjuster 21R is caused to operate, at the right middle portion of the display panel as shown in FIG. 8B when the fourth amplitude adjuster 21R is caused to operate, and at the right bottom portion of the display panel as shown in FIG. 8C when the sixth amplitude adjuster 23R is caused to operate.

On the other hand, since the amplitude of the second misconvergence correcting voltage (the third mixed voltage) $E_V$ obtained from the third voltage mixing circuit block 20V in each of the beginning, middle and end portions of each vertical scanning period corresponding to the top, middle and bottom portions of the display panel, respectively, can be adjusted separately, the dynamic misconvergence in the horizontal direction appearing every vertical period on the display panel can be corrected independently in the top, middle and bottom portions of the display panel.

FIGS. 9A to 9C show positional relations of red, green and blue electron beams R, G and B on the display panel of the color cathode ray tube upon various adjustments for correcting the dynamic misconvergence in the horizontal direction appearing every vertical period. With the third voltage mixing circuit block 20V, the positions of the red and blue beams in relation to the position of the green beam are moved at the top portion of the display panel as shown in FIG. 9A when the eighth amplitude adjuster 22V is caused to operate, at the middle portion of the display panel as shown in FIG. 9B when the seventh amplitude adjuster 21V is caused to operate, and at the bottom portion of the display panel as shown in FIG. 9C when the ninth amplitude adjuster 23V is caused to operate.

In practice, first, the seventh, eighth and ninth amplitude adjusters 21V, 22V and 23V may be operated to correct the dynanic misconvergence in the horizontal direction appearing every vertical period at the central top and bottom portions of the display panel, and then, the first, second and third amplitude adjusters 21L, 22L and 23L and the fourth, fifth and sixth amplitude adjusters 22R, 23R and 24R may be operated to correct the dynamic misconvergence in the horizontal direction in the left and right sides of the display panel. As a result of this, the dynamic misconvergence in the horizontal direction at each of the left top portion, left middle portion, left bottom portion, central top portion, central bottom portion, right top portion, right middle portion and right bottom portion of the display panel can be corrected accurately with simplified adjustments without establishing any tracking relation among them, so that fines images of high quality can be displayed on the color cathode ray tube.

FIGS. 10A to 10G show the waveforms of voltages used in another embodiment of circuit for accomplishing electron beam convergence in a color cathode ray tube according to the present invention. In this case, a common voltage generating circuit block, which corresponds to the circuit block 10 in the embodiment shown in FIG. 3, produces first, second and third voltages $V_O$, $V_T$ and $V_B$ as shown in FIGS. 10B, 10D and 10E, which are identical with the first, second and third voltages $V_O$, $V_T$ and $V_B$ shown in FIGS. 4B, 4F and 4G, respectively, with use of a vertical synchronous signal as shown in FIG. 10A and a switching pulse $P_{VS}$ as shown in FIG. 10C, in the same manner as the common voltage generating circuit block 10 in the embodiment shown in FIG. 3, and also a fourth voltage $V_{ST}$ composed of a portion of a half cycle of sine waveform in the first half of each vertical scanning period and a portion taking earth potential in the second half of each vertical scanning period, as shown in FIG. 10F, and a fifth voltage $V_{SB}$ composed of a portion taking earth potential in the first half of each vertical scanning period and a portion of a half cycle of sine waveform in the second half of each vertical scanning period, as shown in FIG. 10G. The first, second, third, fourth and fifth voltages $V_O$, $V_T$, $V_B$, $V_{ST}$ and $V_{SB}$ are adjusted in amplitude separately by five amplitude adjusters, respectively, provided in first, second and third voltage mixing circuit blocks, which correspond to the first, second and third voltage mixing circuit blocks 20L, 20R and 20V in the embodiment shown in FIG. 3, respectively, and then mixed with one another. With such an arrangement, the accuracy in correction of the dynamic misconvergence in the horizontal direction caused on the display panel of a color cathode ray tube can be more increased.

What is claimed is:

1. A circuit for accomplishing electron beam convergence in a color cathode ray tube comprising;

first voltage generating circuit means for producing a first voltage of parabolic waveform in a first polarity which has the vertical period and is clamped to be a reference potential at the beginning and end of each vertical scanning period, a second voltage composed of a portion of parabolic waveform in a second polarity, which has the vertical period and is clamped to be the reference potential at the middle of each vertical scanning period, obtained during the first half of each vertical scanning period and a portion taking the reference potential during the second half of each vertical scanning period, and a third voltage composed of a portion taking the reference potential during the first half of each vertical scanning period and a portion of parabolic waveform in the second polarity, which has the vertical period and is clamped to be the reference potential at the middle of each vertical scanning period, obtained in the second half of each vertical scanning period, first voltage mixing circuit means for adjusting the amplitude of each of said first, second and third voltages separately and then mixing the first, second and third voltages each adjusted in amplitude with one another to produce a first mixed voltage, second voltage mixing circuit means for adusting the amplitude of each of said first, second and third voltages separately and then mixing the first, second and third voltages adjusted in amplitude with one another to produce a second mixed voltage, third voltage mixing circuit means for adjusting the amplitude of each of said first, second and third voltages separately and then mixing the first, second and third voltages adjusted in amplitude with one another to produce a third mixed voltage, second voltage generating circuit means for producing a first correcting voltage which has a waveform obtained by modulating the amplitude of a voltage of parabolic waveform having the horizontal period with said first mixed voltage and is clamped to be the reference potential at the middle of each horizontal scanning period, third voltage generating circuit means for producing a second correcting voltage which has a waveform obtained by modulating the amplitude of the voltage of parabolic waveform having the horizontal period with said second mixed voltage and is clamped to be the reference potential at the middle of each horizontal scanning period, switching means for extracting said first correcting voltage during the first half of each horizontal scanning period and said second correcting voltage during the following half of the horizontal scanning period, and voltage supplying means for supplying the voltages extracted by said switching means and said third mixed voltage to deflecting means provided for deflecting electron beams in the color cathode ray tube to accomplish their convergence.

2. A circuit according to claim 1, wherein said first voltage generating circuit means comprises an inverter for inverting said first voltage in its polarity to cause the same to have the second polarity, a clamping circuit for clamping the first voltage with the second polarity to be the reference potential at the middle of each horizontal scanning period, and means for extracting the output of said clamping circuit during the first half of each horizontal scanning period to produce said second voltage and during the second half of each horizontal scanning period to produce said third voltage.

3. A circuit according to claim 1, wherein each of said first, second and third voltage mixing circuit means comprises three amplitude adjusters for causing said first, second and third voltages to be subjected to independent amplitude-adjustments, respectively, and a mixer for mixing the first, second and third voltages having the respective adjusted amplitude with one another.

4. A circuit according to claim 1, wherein each of said second and third voltage generating circuit means comprises parabolic voltage producing means for supplying a voltage of parabolic waveform having the horizontal period and the amplitude varying in response to the parabolic waveform of one of said first and second mixed voltages, and clamping means for clamping the voltage of parabolic waveform supplied by said parabolic voltage producing means to be the reference potential at the middle of each horizontal scanning period.

5. A circuit according to claim 3, wherein said first voltage producing circuit means further produces a fourth voltage composed of a portion of a half cycle of sine waveform in the first half of each vertical scanning period and a portion taking the reference potential in the second half of each vertical scanning period, and a fifth voltage composed of a portion taking the reference potential in the first half of each vertical scanning period and a portion of a half cycle of sine waveform in the second half of each vertical scanning period, and each of said first, second and third voltage mixing circuit means further comprises two additional amplitude adjusters for causing said fourth and fifth voltages to be subjected to independently amplitude-adjustments, respectively, and supplying the fourth and fifth voltages having the respective adjusted amplitude to said mixer.

* * * * *